(12) United States Patent
Delord et al.

(10) Patent No.: US 9,296,426 B2
(45) Date of Patent: Mar. 29, 2016

(54) CHASSIS OF A MOTOR VEHICLE INCLUDING A MEANS FOR ABSORBING A FRONTAL IMPACT

(71) Applicant: RENAULT s.a.s., Boulogne-Billancourt (FR)

(72) Inventors: Christian Delord, Pavillons Sous Bois (FR); Herve Gaumont, Velizy (FR); Thierry Hlubina, Chaville (FR); Jerome Caillard, Gif sur Yvette (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/390,485

(22) PCT Filed: Apr. 4, 2013

(86) PCT No.: PCT/FR2013/050744
§ 371 (c)(1),
(2) Date: Oct. 3, 2014

(87) PCT Pub. No.: WO2013/150245
PCT Pub. Date: Oct. 10, 2013

(65) Prior Publication Data
US 2015/0166107 A1 Jun. 18, 2015

(30) Foreign Application Priority Data
Apr. 5, 2012 (FR) ...................... 12 53157

(51) Int. Cl.
*B62D 21/15* (2006.01)
*B62D 25/20* (2006.01)
(Continued)

(52) U.S. Cl.
CPC .............. *B62D 21/152* (2013.01); *B62D 21/02* (2013.01); *B62D 21/09* (2013.01); *B62D 21/18* (2013.01); *B62D 25/2018* (2013.01); *B62D 27/02* (2013.01)

(58) Field of Classification Search
CPC .... B62D 21/09; B62D 27/02; B62D 25/2018; B62D 25/082; B62D 25/085; B62D 21/152
USPC ...................... 296/187.09, 193.09, 203.02, 30
See application file for complete search history.

(56) References Cited

U.S. PATENT DOCUMENTS

2003/0141712 A1 7/2003 Miyasaka
2009/0001761 A1* 1/2009 Yasuhara et al. ......... 296/193.07
(Continued)

FOREIGN PATENT DOCUMENTS

| DE | 102006008669 B4 * | 10/2014 |
|----|-------------------|---------|
| FR | 2 941 201 | 7/2010 |
| FR | 2 941 209 | 7/2010 |

OTHER PUBLICATIONS

International Search Report issued Jun. 25, 2013, in PCT/FR13/050744 filed Apr. 4, 2013.
(Continued)

*Primary Examiner* — Jason S Morrow
(74) *Attorney, Agent, or Firm* — Oblon, McClelland, Maier & Neustadt, L.L.P.

(57) ABSTRACT

A chassis of a motor vehicle including a mechanism for absorbing a frontal impact including two side rails mounted on a front portion of the chassis and arranged on either side of the chassis, a front crossmember mounted under a floor of a passenger compartment of the vehicle in contact with a transmission tunnel arranged on a central axis and extending from the front crossmember towards a rear portion of the chassis. Each side rail includes one end mounted to engage with the front crossmember.

16 Claims, 2 Drawing Sheets

(51) Int. Cl.
  *B62D 21/02* (2006.01)
  *B62D 21/09* (2006.01)
  *B62D 21/18* (2006.01)
  *B62D 27/02* (2006.01)

(56) References Cited

U.S. PATENT DOCUMENTS

| | | | |
|---|---|---|---|
| 2009/0146462 A1* | 6/2009 | Sato et al. | 296/203.03 |
| 2010/0171340 A1* | 7/2010 | Yasuhara et al. | 296/205 |
| 2011/0133518 A1* | 6/2011 | Wanke et al. | 296/203.02 |
| 2013/0069393 A1* | 3/2013 | Kihara et al. | 296/203.02 |
| 2013/0088048 A1* | 4/2013 | Ichikawa | 296/203.02 |
| 2013/0334840 A1* | 12/2013 | Iseki et al. | 296/193.09 |
| 2015/0145284 A1* | 5/2015 | Nishida et al. | 296/187.1 |
| 2015/0166108 A1* | 6/2015 | Persson et al. | B62D 21/152 |

OTHER PUBLICATIONS

French Preliminary Search Report issued Dec. 19, 2012, in French Application No. 12 53157 filed Apr. 5, 2012.

* cited by examiner

CHASSIS OF A MOTOR VEHICLE INCLUDING A MEANS FOR ABSORBING A FRONTAL IMPACT

BACKGROUND

The invention relates to the front part of the chassis of a motor vehicle, in particular an electric-propulsion vehicle, and more particularly to the fastening of a front longitudinal member.

In conventional solutions for transferring force from the front of the vehicle toward the rear during a frontal impact, the majority of the forces are transferred from a front longitudinal member toward a central longitudinal member which is situated in the continuation thereof along the longitudinal axis of the chassis. A lesser part of the forces is transferred laterally by a lateral skirt or by a tunnel at the centre of the chassis.

U.S. Pat. No. 6,926,352 describes a motor vehicle chassis of this type comprising two longitudinal members at the front of the vehicle distributed on each side, a central floor tunnel, and two central longitudinal members for transferring the forces experienced during a frontal impact to the rear of the vehicle.

U.S. Pat. No. 7,810,878 describes a motor vehicle chassis comprising a bumper mounted on front longitudinal members transmitting the forces experienced during a frontal impact to the rear part of a motor vehicle via central longitudinal members passing below the central floor of the motor vehicle and skirts mounted at the periphery of the chassis.

In the case of an electric vehicle, the central floor is generally raised so as to allow the battery to be housed therebelow. The central longitudinal member passing below the floor then reduces the available storage space for the batteries, mainly along a transverse axis, that is to say in a direction orthogonal to the front-rear direction of the vehicle. This reduction in the available storage space is highly prejudicial for the storage capacity of the batteries and therefore for the autonomy of the motor vehicle, in particular in a compact vehicle.

BRIEF SUMMARY

The invention proposes to provide a chassis comprising force transfer means making it possible to free up an available space zone for the storage of the batteries below the central floor of the motor vehicle over its whole width while ensuring that forces due to a frontal impact are transferred from the front to the rear of the vehicle.

According to one aspect of the invention, there is proposed in one embodiment a motor vehicle chassis provided with means for absorbing a frontal impact comprising two longitudinal members mounted on a front portion of the chassis and arranged on each side of the chassis, a front crossmember mounted below the floor of the passenger compartment of the vehicle in contact with a transmission tunnel arranged on a central axis and extending from the front crossmember toward a rear portion of the chassis.

According to a general characteristic, each longitudinal member comprises an end mounted so as to butt against the front crossmember, the chassis thus comprising a space below the floor free from central longitudinal members.

The front crossmember mounted on the longitudinal members of the front portion of the chassis allows a connection to be made between the longitudinal members and the transmission tunnel of the motor vehicle. This connection makes it possible to transfer at least some of the forces due to the frontal impact toward the transmission tunnel and to free up the space below the floor for the storage of batteries.

The front crossmember also makes it possible to provide a mount for fastening the battery.

Furthermore, the front crossmember allows good protection of the battery in the case of a side impact owing to the position of the crossmember with respect to the battery.

Advantageously, the means for absorbing the frontal impact may additionally comprise two brackets each mounted between a longitudinal member and the front crossmember, each bracket being dimensioned so as to have an end at the height of the transmission tunnel and having a shape with a flank inclined at an angle between the front longitudinal member to which it is coupled and the front crossmember.

The brackets make it possible, on the one hand, to contribute to the rigidity of the chassis, on the other hand, to optimize the transmission of the forces due to the frontal impact toward the transmission tunnel, and, finally, to limit rotation about a vertical axis of the longitudinal member.

Preferably, the chassis comprises two skirts mounted on each side of the chassis, and the means for absorbing the frontal impact additionally comprise two lateral crossmembers each mounted between a longitudinal member and a skirt, at the height of the front crossmember.

The fastening of the lateral crossmember between a longitudinal member and a skirt makes it possible to contribute to the rigidity of the chassis, on the one hand, and to transmit some of the forces due to a frontal impact to a skirt so that these forces are transmitted and dissipated toward the rear of the chassis.

It is thus possible to form a motor vehicle chassis free from central longitudinal members and capable of transmitting the forces experienced to the tunnel and to the skirts. That additionally makes it possible to increase the space available below the central floor and therefore to use all the space below the floor for the storage of the batteries and thus to increase the capacities of the electric-traction motor vehicle, including the autonomy.

Preferably, each lateral crossmember has a shape inclined toward the rear on the skirt side so as to form an obtuse angle between the longitudinal member and the inclination of the lateral crossmember.

The inclined shape of the flank of the lateral crossmember makes it possible to promote the transfer of forces toward the rear.

Advantageously, the front crossmember, the longitudinal members and the brackets may be assembled with the aid of spot welds.

BRIEF DESCRIPTION OF THE DRAWINGS

Other advantages and features of the invention will become apparent on examining the detailed description of a nonlimiting embodiment and the appended drawings, in which.

DETAILED DESCRIPTION

Figure 1:
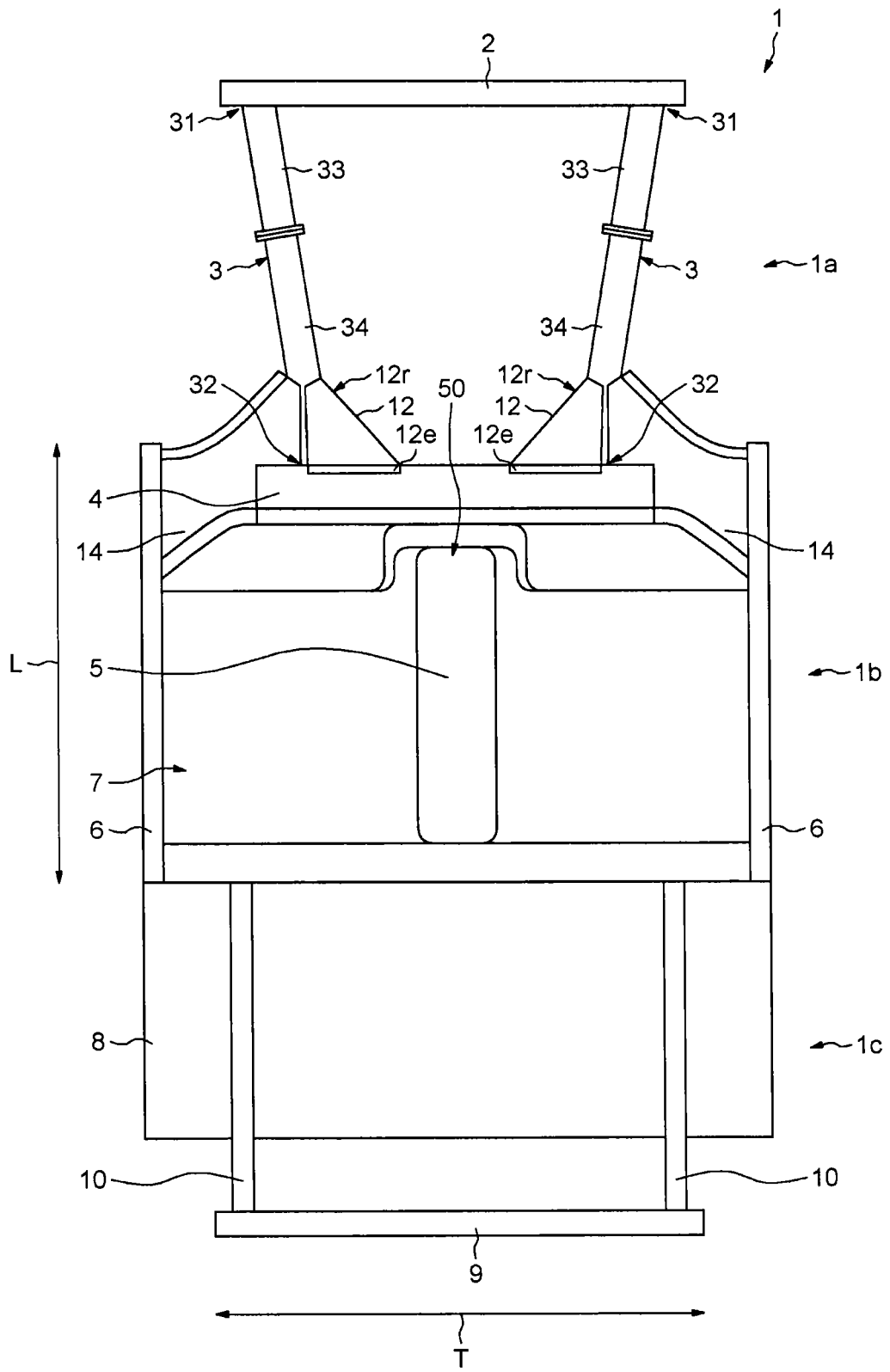
FIG. 1 schematically illustrates a plan view of a chassis of a motor vehicle according to one embodiment.

FIG. 1 schematically represents a plan view of a motor vehicle chassis 1 according to one embodiment of the invention.

The chassis 1 comprises a front portion 1a comprising inter alia a front bumper 2, longitudinal members 3 and a front crossmember 4, a central portion 1b comprising inter alia a transmission tunnel 5, skirts 6 and a central floor 7, and a rear portion 1c comprising in particular a luggage compartment floor 8 and a rear bumper 9 which are coupled to rear longitudinal members 10.

In the front portion 1a of the chassis 1, the front bumper 2 extends in a transverse direction T, that is to say orthogonal to the front/rear direction of the chassis 1, and is assembled with two longitudinal members 3 extending in a longitudinal direction L, parallel to the front/rear direction of the chassis.

Each longitudinal member 3 comprises a first end 31 to which is fixed the bumper 2 and a second end 32 to which is fixed the front crossmember 4 extending in the transverse direction T parallel to the bumper 2. The longitudinal members 3 help to stiffen the chassis 1 and provide a mount for engine elements and for body elements of the motor vehicle. They are also designed to help in absorbing energy during a frontal impact in particular. They make it possible for the forces experienced by the front bumper 2 during a frontal impact to be transmitted toward the rear portion 1c of the chassis 1 while absorbing some of the energy associated with the forces.

In this example, the longitudinal members 3 are produced as a front part 33 and a rear part 34 assembled together. The longitudinal members may also be produced as a single part.

Figure 2:
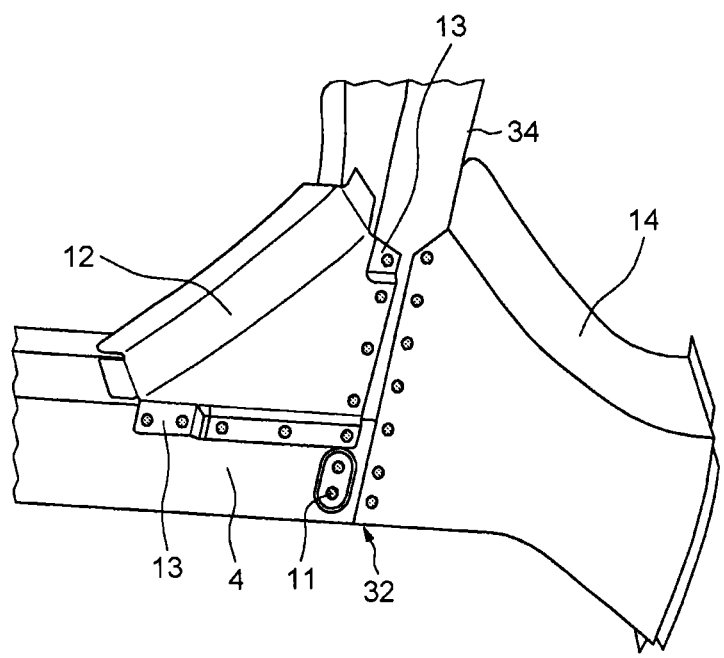
FIG. 2 shows a perspective bottom view of a front portion of the chassis.

The second end 32 of each longitudinal member 3 rests in abutment against the crossmember 4, as is illustrated in FIG. 2, which shows a detailed perspective view of part of the front portion 1a of the chassis. The front crossmember 4 is a profile having a U-shaped cross section oriented so as to receive the longitudinal members 3 in the hollow of the profile.

The longitudinal members 3 therefore do not extend beyond the front crossmember 4. They are fastened to the crossmember 4 by spot welds 11.

The front portion 1a of the chassis 1 also comprises two brackets 12, as is illustrated in FIGS. 1 and 2. Each bracket 12 is mounted between a longitudinal member 3 and the crossmember 4 so as to stiffen the structure of the chassis 1 and to improve the degree of energy transfer during a frontal impact between the longitudinal members 3 and the transmission tunnel 5 along a longitudinal axis centred on the chassis 1.

Each bracket 12 is assembled with a longitudinal member 3 and the front crossmember 4 with the aid of fastening tabs 13 bearing below the front crossmember 4 and below the longitudinal member 3. The brackets 12 are also fastened by spot welds 11 to the longitudinal member 3 and to the front crossmember 4.

Each bracket 12 has an oblique reinforcing face 12r (FIG. 1) extending between the longitudinal member 3 to which it is coupled and the front crossmember 4. The brackets 12 are dimensioned in such a way that the end 12e of the reinforcing face 12r is arranged facing the inlet 50 of the transmission tunnel 5. In this way, the degree of energy transmitted toward the transmission tunnel 5 during a frontal impact is maximized.

The chassis 1 also comprises two lateral crossmembers 14 each extending between a longitudinal member 3 and a skirt 6 extending in the longitudinal direction L at the periphery of the chassis 1 between the front portion 1a and the central portion 1b. Each lateral crossmember 14 is fastened to a longitudinal member 3 at the height of the second end 32 by spot welds 11.

The lateral crossmembers 14 extend between the longitudinal member 3 and the skirt 6 in an oblique direction such that the portion of the lateral crossmember 14 coupled to the skirt 6 is to the rear with respect to the portion of the lateral crossmember coupled to the longitudinal member 3. The angle thus formed between the longitudinal member 3 and the lateral crossmember is an obtuse angle.

There is thus obtained a longitudinal member 3 coupled to a front crossmember 4 having two elements for transmitting force, namely the bracket 12 and the lateral crossmember 14, along two vanishing lines leading away from the longitudinal member and oriented toward the rear of the chassis 1.

The front portion 1a of the chassis 1 thus comprises means for absorbing a frontal impact comprising a front bumper 2, longitudinal members 3 coupled, on the one hand, to a crossmember 4 with brackets 12, and coupled, on the other hand, to lateral crossmembers 14 coupled to skirts 6.

The energy due to a frontal impact on the front bumper 2 is thus transmitted to the rear portion 1c of the chassis 1, on the one hand, via the central transmission tunnel 5 passing over the central floor 7 and mounted on the front crossmember 4, and, on the other hand, via the skirts 6 extending on each side of the chassis 1.

Such means for absorbing a frontal impact thus make it possible to keep the zone below the central floor 7 entirely free for the storage of batteries, and thus to increase the possible autonomy, for example, of an electric-traction motor vehicle given the available volume below the central floor 7.

The invention claimed is:

1. A motor vehicle chassis comprising:
   means for absorbing a frontal impact comprising two brackets and two longitudinal members, the two longitudinal members being mounted on a front portion of the chassis and arranged on each side of the chassis; and
   a front crossmember mounted below a floor of a passenger compartment of the vehicle in contact with a transmission tunnel arranged on a central axis and extending from the front crossmember toward a rear portion of the chassis;
   wherein each longitudinal member comprises an end mounted to butt against the front crossmember, and
   wherein the two brackets are each mounted between one of the longitudinal members and the front crossmember.

2. The chassis as claimed in claim 1, wherein each of the two brackets is dimensioned to have an end facing the transmission tunnel and having a shape with a flank inclined at an angle between the longitudinal member to which it is coupled and the front crossmember.

3. The chassis as claimed in claim 1, further comprising two skirts mounted on each side of the chassis, wherein the means for absorbing the frontal impact further comprises two lateral crossmembers each mounted between one of the longitudinal members and one of the skirts, at a height of the front crossmember.

4. The chassis as claimed in claim 3, wherein each lateral crossmember has a shape inclined toward the rear on a side of the skirt to form an obtuse angle between the longitudinal member and the lateral crossmember.

5. The chassis as claimed in claim 2, wherein the brackets are fastened to the longitudinal members with spot welds.

6. The chassis as claimed in claim 5, wherein the brackets are fastened to the front crossmember with spot welds.

7. The chassis as claimed in claim 1, wherein the brackets are fastened to the longitudinal members and the front crossmember with spot welds.

8. The chassis as claimed in claim 1, wherein the front crossmember has a U-shaped cross section oriented to receive the end of the longitudinal members in a hollow of the U-shaped cross section.

9. A motor vehicle chassis, comprising:
   two longitudinal members mounted on a front portion of the chassis and arranged on each side of the chassis;

a front crossmember mounted below a floor of a passenger compartment of the vehicle in contact with a transmission tunnel arranged on a central axis and extending from the front crossmember toward a rear portion of the chassis; and two brackets, each of the two brackets being mounted between one of the longitudinal members and the front crossmember wherein each longitudinal member comprises an end mounted to butt against the front crossmember.

10. The chassis as claimed in claim 9, wherein each of the two brackets is dimensioned to have an end facing the transmission tunnel and having a shape with a flank inclined at an angle between the longitudinal member to which it is coupled and the front crossmember.

11. The chassis as claimed in claim 9, further comprising:

two skirts mounted on each side of the chassis; and two lateral crossmembers each mounted between one of the longitudinal members and one of the skirts at a height of the front crossmember.

12. The chassis as claimed in claim 11, wherein each lateral crossmember has a shape inclined toward the rear on a side of the skirt to form an obtuse angle between the longitudinal member and the lateral crossmember.

13. The chassis as claimed in claim 10, wherein the brackets are fastened to the longitudinal members with spot welds.

14. The chassis as claimed in claim 13, wherein the brackets are fastened to the front crossmember with spot welds.

15. The chassis as claimed in claim 9, wherein the brackets are fastened to the longitudinal members and the front crossmember with spot welds.

16. The chassis as claimed in claim 9, wherein the front crossmember has a U-shaped cross section oriented to receive the end of the longitudinal members in a hollow of the U-shaped cross section.

* * * * *